(12) United States Patent
Schmidl et al.

(10) Patent No.: US 7,161,941 B1
(45) Date of Patent: Jan. 9, 2007

(54) WIRELESS PACKET COMMUNICATIONS WITH EXTENDED ADDRESSING CAPABILITY

(75) Inventors: Timothy M. Schmidl, Dallas, TX (US); Mohammed Nafie, Richardson, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1080 days.

(21) Appl. No.: 09/635,146

(22) Filed: Aug. 8, 2000

Related U.S. Application Data

(60) Provisional application No. 60/186,032, filed on Mar. 1, 2000.

(51) Int. Cl.
   *H04L 12/28* (2006.01)
(52) U.S. Cl. .................. 370/392; 370/389; 370/338; 370/328
(58) Field of Classification Search ................ 370/313, 370/349, 389–393, 470–476
   See application file for complete search history.

(56) References Cited

U.S. PATENT DOCUMENTS

| | | | |
|---|---|---|---|
| 5,450,407 A * | 9/1995 | Perlman et al. | 370/392 |
| 6,094,146 A * | 7/2000 | Sharpe | 340/7.43 |
| 6,115,394 A * | 9/2000 | Balachandran et al. | 370/477 |
| 6,118,775 A * | 9/2000 | Kari et al. | 370/349 |
| 6,205,140 B1 * | 3/2001 | Putzolu et al. | 370/389 |
| 6,243,380 B1 * | 6/2001 | Malkin | 370/392 |
| 6,295,296 B1 * | 9/2001 | Tappan | 370/392 |
| 6,301,257 B1 * | 10/2001 | Johnson et al. | 370/406 |
| RE37,494 E * | 1/2002 | Cantoni et al. | 370/395 |
| 6,363,070 B1 * | 3/2002 | Mullens et al. | 370/389 |
| 6,366,961 B1 * | 4/2002 | Subbiah et al. | 709/238 |
| 6,430,167 B1 * | 8/2002 | Falk | 370/325 |
| 6,496,505 B1 * | 12/2002 | La Porta et al. | 370/392 |
| 6,570,857 B1 * | 5/2003 | Haartsen et al. | 370/312 |
| 6,577,627 B1 * | 6/2003 | Driscoll et al. | 370/389 |
| 6,601,093 B1 * | 7/2003 | Peters | 709/220 |
| 6,611,521 B1 * | 8/2003 | McKay et al. | 370/392 |
| 6,628,641 B1 * | 9/2003 | Strawczynski et al. | 370/349 |
| 6,647,005 B1 * | 11/2003 | Cao et al. | 370/342 |
| 6,728,246 B1 * | 4/2004 | Egbert et al. | 370/392 |
| 6,751,200 B1 * | 6/2004 | Larsson et al. | 370/255 |
| 2003/0097398 A1 * | 5/2003 | Knox et al. | 709/203 |
| 2003/0133448 A1 * | 7/2003 | Frink et al. | 370/389 |

OTHER PUBLICATIONS

Haartsen et al., "Bluetooth: Vision, Goals, and Architecture", Mobile Computing and Communications Review, vol. 1, No. 2, 1998, pp. 1-8.*
Haartsen, Jaap C., "The Bluetooth Radio System", IEEE Personal Communications, Feb. 2000, pp. 28-36.*
"Networks for Homes", Amitava Dutta-Roy, IEEE Spectrum, Dec. 1999, pp. 26-33.

* cited by examiner

*Primary Examiner*—Seema S. Rao
*Assistant Examiner*—Michael J Moore
(74) *Attorney, Agent, or Firm*—Ronald O. Neerings; W. James Brady, III; Frederick J. Telecky, Jr.

(57) ABSTRACT

In packet communications, one existing address code in a predetermined address field (AM_ADDR) of a packet can be used to indicate that bits in another field (TYPE) of the packet represent additional address information. Additional address information can also be provided for by extending the length of the predetermined address field.

25 Claims, 5 Drawing Sheets

| USER NUMBER | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| AM_ADDR | 001 | 010 | 011 | 100 | 101 | 110 | 111 | 111 | 111 | 111 | 111 | 111 | 111 | 111 |
| TYPE | xxx | xxx | xxx | xxx | xxx | xxx | 000 | 001 | 010 | 011 | 100 | 101 | 110 | 111 |

FIG. 1 (PRIOR ART)
| FIELD | NUMBER OF BITS | DESCRIPTION |
|---|---|---|
| AM_ADDR | 3 | ACTIVE MEMBER ADDRESS |
| TYPE | 4 | TYPE CODE |
| FLOW | 1 | FLOW CONTROL |
| ARQN | 1 | ACKNOWLEDGE INDICATION |
| SEQN | 1 | SEQUENCE NUMBER |
| HEC | 8 | HEADER ERROR CHECK |
FIG. 2
| USER NUMBER | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| AM_ADDR | 001 | 010 | 011 | 100 | 101 | 110 | 111 | 111 | 111 | 111 | 111 | 111 | 111 | 111 |
| TYPE | xxx | xxx | xxx | xxx | xxx | xxx | 000 | 001 | 010 | 011 | 100 | 101 | 110 | 111 |
FIG. 3
FIG. 4
FIG. 5
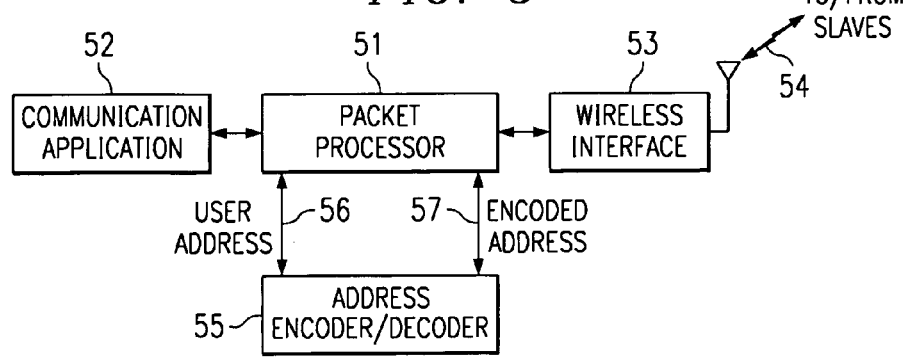

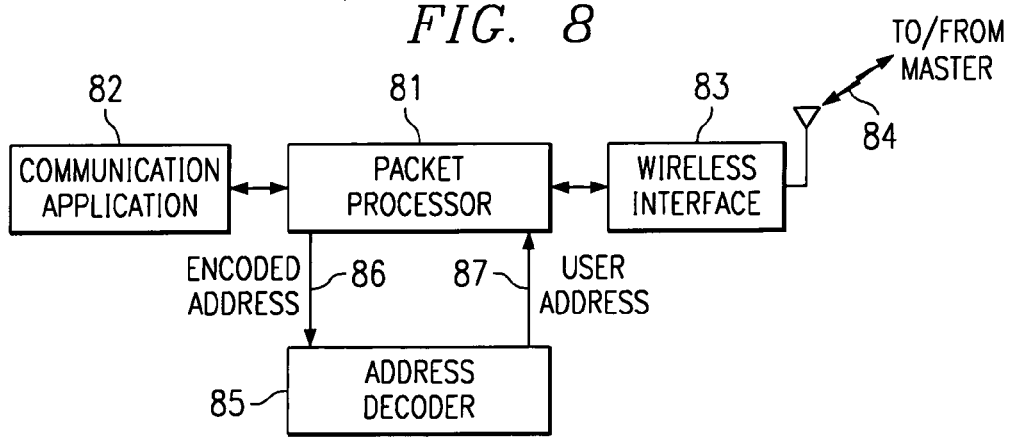
FIG. 8
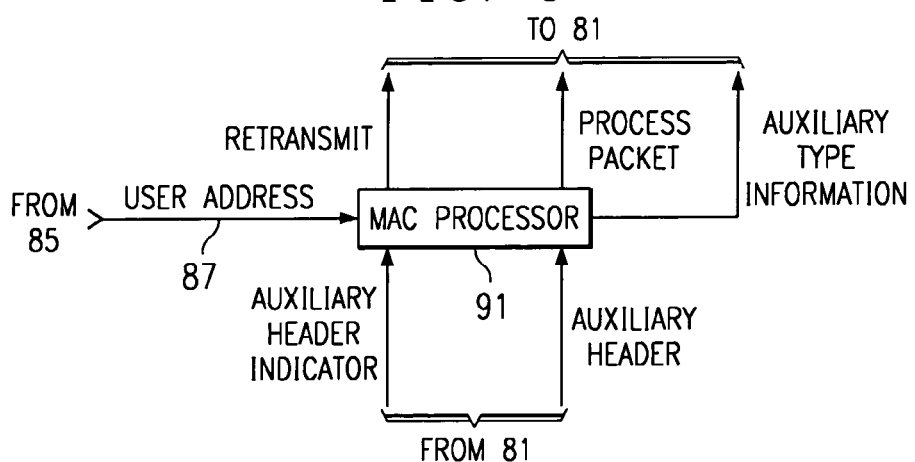
FIG. 9
FIG. 11
| FIELD | NUMBER OF BITS | DESCRIPTION |
|---|---|---|
| AM_ADDR | 4 | ACTIVE MEMBER ADDRESS |
| TYPE | 4 | TYPE CODE |
| FLOW | 1 | FLOW CONTROL |
| ARQN | 1 | ACKNOWLEDGE INDICATION |
| SEQN | 1 | SEQUENCE NUMBER |
| HEC | 8 | HEADER ERROR CHECK |

WIRELESS PACKET COMMUNICATIONS WITH EXTENDED ADDRESSING CAPABILITY

CAPABILITY

This application claims the priority under 35 U.S.C. 119(e) of copending U.S. provisional application No. 60/186,032, filed on Mar. 1, 2000.

FIELD OF THE INVENTION

The invention relates generally to wireless packet communications and, more particularly, to extended addressing schemes for use in wireless packet communications.

BACKGROUND OF THE INVENTION

Present telecommunication system technology includes a wide variety of wireless networking systems associated with both voice and data communications. As overview of several of these wireless networking systems is presented by Amitava Dutta-Roy, *Communications Networks for Homes,* IEEE Spectrum, pg. 26, December 1999. Therein, Dutta-Roy discusses several communication protocols in the 2.4 GHz band, including IEEE 802.11 direct-sequence spread spectrum (DSSS) and frequency-hopping (FHSS) protocols. A disadvantage of these protocols is the high overhead associated with their implementation. A less complex wireless protocol known as Shared Wireless Access Protocol (SWAP) also operates in the 2.4 GHz band. This protocol has been developed by the HomeRF Working Group and is supported by North American communications companies. The SWAP protocol uses frequency-hopping spread spectrum technology to produce a data rate of 1 Mb/sec. Another less complex protocol is named Bluetooth™ after a $10^{th}$ century Scandinavian king who united several Danish kingdoms. This protocol also operates in the 2.4 GHz band and advantageously offers short-range wireless communication between Bluetooth™ devices without the need for a central network.

The Bluetooth™ protocol provides a 1 Mb/sec data rate with low energy consumption for battery powered devices operating in the 2.4 GHz ISM (industrial, scientific, medical) band. The current Bluetooth™ protocol provides a 10-meter range and a maximum asymmetric data transfer rate of 723 kb/sec. The protocol supports a maximum of three voice channels for synchronous, CVSD-encoded transmission at 64 kb/sec. The Bluetooth™ protocol treats all radios as peer units except for a unique 48-bit address. At the start of any connection, the initiating unit is a temporary master. This temporary assignment, however, may change after initial communications are established. Each master may have active connections of up to seven slaves. Such a connection between a master and one or more slaves forms a "piconet." Link management allows communication between piconets, thereby forming "scatternets." Typical Bluetooth™ master devices include cordless phone base stations, local area network (LAN) access points, laptop computers, or bridges to other networks. Bluetooth™ slave devices may include cordless handsets, cell phones, headsets, personal digital assistants, digital cameras, or computer peripherals such as printers, scanners, fax machines and other devices.

The Bluetooth™ protocol uses time-division duplex (TDD) to support bidirectional communication. Frequency hopping permits operation in noisy environments and permits multiple piconets to exist in close proximity. The frequency hopping scheme permits up to 1600 hops per second over 79 1-MHZ channels or the entire 2.4 GHz ISM spectrum. Various error correcting schemes permit data packet protection by ⅓ and ⅔ rate forward error correction. Further, Bluetooth™ uses retransmission of packets for guaranteed reliability. These schemes help correct data errors, but at the expense of throughput.

The Bluetooth™ protocol is specified in detail in *Specification of the Bluetooth System,* Version 1.0A, Jul. 26, 1999, which is incorporated herein by reference.

The Bluetooth™ standard currently allows only 7 active slaves within a piconet. This is because there is only a 3-bit active member address field, so there are only 8 addresses available. One of these addresses is reserved for broadcast packets, leaving only 7 addresses available for active slaves. In some cordless telephone applications, such as in a small office environment, there may be a need to support 12 or more slave devices, i.e., cordless telephones.

It is therefore desirable to extend the addressing capabilities of wireless communication systems such as Bluetooth™ systems.

The invention provides extended addressing capability in a Bluetooth™ system. According to the invention, one existing address code in an address field of a packet is used to indicate that bits in another field of the packet represent additional address information. Further according to the present invention, the address field can be extended in order to provide a plurality of additional address codes. These extended addressing capabilities also provide backward compatibility to conventional Bluetooth™ devices.

BRIEF DESCRIPTION OF THE DRAWINGS

FIG. 1 illustrates the fields of a Bluetooth™ conventional packet header.

FIG. 2 illustrates address encoding and decoding according to the invention.

FIGS. 3 and 4 diagrammatically illustrate selective use of an auxiliary header according to the invention.

FIG. 5 diagrammatically illustrates pertinent portions of exemplary embodiments of a Bluetooth™ master device that can implement the address encoding and decoding illustrated in FIG. 2.

FIG. 8 diagrammatically illustrates pertinent portions of an exemplary embodiment of a slave device which can implement the address decoding illustrated in FIG. 2.

FIG. 9 diagrammatically illustrates pertinent portions of an exemplary embodiment of a slave device which can support the auxiliary header technique illustrated in FIGS. 3 and 4.

FIG. 11 illustrates the header fields of an extended Bluetooth™ header according to the invention.

DETAILED DESCRIPTION

Figure 6:
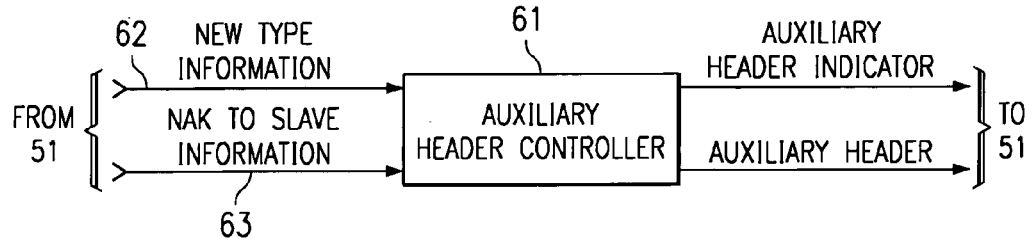
FIG. 6 diagrammatically illustrates pertinent portions of an exemplary embodiment of a master device which can implement the auxiliary header technique shown in FIGS. 3 and 4.

FIG. 1 illustrates in tabular form the 6 fields of the packet header according to the aforementioned Bluetooth™ specification. These six fields include a total of 18 bits, which can be encoded with a ⅓ rate repetition code to form a 54-bit header. According to the present invention, one address defined by the address field AM_ADDR can be reserved as a pointer that designates additional addresses. These additional addresses can be located in the TYPE field. FIG. 2 provides an example of how this pointer can be used to encode/decode additional addresses.

In FIG. 2, if the address field (AM_ADDR) contains one of the first 6 addresses (001 through 110), then normal Bluetooth™ addressing can be used. These first 6 addresses can be assigned by the master device to conventional Bluetooth™ slave devices. In the example of FIG. 2, the address 111 is used as the pointer which points to 8 other addresses which are indicated by 3 bits of the TYPE field. When a slave device reads the address 111 in the address field (AM_ADDR), it knows that 3 bits in the TYPE field correspond to an extended address. Thus, a total of 6+8=14 slave devices (corresponding to the user numbers in FIG. 2) can be addressed. The address 000 in the example of FIG. 2 is reserved for broadcast packets. The TYPE bits shown as "x" in FIG. 2 can be conventional packet type information.

The exemplary address encoding/decoding technique illustrated in FIG. 2 can be extended to include two or more reserved pointer addresses to extend the addressing capability even more so that even more users (slave devices) can be supported. For example, by reserving two addresses in the AM_ADDR address field as pointers, a total of 5+2(8)=21 addresses are available. Also, the fourth bit of the TYPE field could be used for extended addressing so that the TYPE field could define 16 additional addresses. In this case, using a single address pointer in the AM_ADDR field would provide 6+16=22 addresses, and using two pointers in the AM_ADDR field would provide 5+2(16)=37 addresses.

In some embodiments, the fourth bit of the TYPE field can be used for other purposes. For example, the fourth TYPE bit can be an auxiliary header indicator that indicates whether or not an auxiliary header is included in the packet. For telephony applications, most of the packets will be voice packets. Thus, voice packets can be set as the default packet type, represented for example by clearing the fourth TYPE bit to 0. However, if the fourth TYPE bit (i.e., the auxiliary header indicator) is a 1, this can indicate that the packet includes an auxiliary header containing, for example, packet type information. In some embodiments, this auxiliary header, illustrated in FIG. 3, contains 4 TYPE bits and corresponding HEC information. On the other hand, if the fourth TYPE bit is equal to 0, this means that the auxiliary header has not been sent, as illustrated in FIG. 4, and the default type (e.g., voice packet) is assumed at the receiving end. In cordless telephone systems and other applications that utilize mostly voice packets, the auxiliary header would rarely need to be sent, because voice can be set as the default packet type.

In some embodiments, the auxiliary header can also be used to convey a negative acknowledgment (NAK) to a first slave device in a packet which is actually addressed to a second slave device. For example, some conventional Bluetooth™ systems reserve certain retransmission time slots for the master device to retransmit a packet to a slave device from which the master has previously received a negative acknowledgment (NAK). If the master is using a retransmission time slot to retransmit a packet to the aforementioned second slave device, the master can include the aforementioned first slave device's address in the auxiliary header of FIG. 3. If the first slave device recognizes its address in the auxiliary header, then it knows that this represents a NAK from the master, to which it can respond, for example, by retransmitting in the next time slot. Thus, in a single time slot, the master can send a retransmission to the second slave device and a NAK to the first slave device. Although this retransmission packet from the master does not include packet type information in either the standard TYPE field (of FIG. 1) or in the auxiliary header, the second device can determine the packet type from the conventional header bit SEQN because, in a retransmission time slot, the type of packet transmitted from the master device to the second slave device will either be a retransmission packet or a NAK packet. The second slave device can therefore use the conventional SEQN bit to determine whether the packet is a retransmission packet or a NAK packet.

FIG. 5 diagrammatically illustrates pertinent portions of exemplary embodiments of a master device according to the invention. The master device of FIG. 5 could be, for example, a Bluetooth™ master device provided in a base unit of a cordless telephone system. The device of FIG. 5 includes a packet processor 51 coupled for bidirectional communication with a communications application 52 and a wireless communications interface 53. The packet processor receives communication information from the communications application 52, and can utilize well known conventional techniques to assemble the communication information into appropriate packets. The assembled packets are then forwarded to the wireless communications interface 53, which can use well known conventional techniques to transmit the packets to a plurality of slaves via a wireless communication link 54, for example a Bluetooth™ radio link.

Similarly, the wireless communications interface 53 can use well known conventional techniques for receiving packets from the slaves via the wireless communication link 54. The received packets are then forwarded to the packet processor 51, which can use well known conventional techniques to disassemble the packets and forward the associated communication information to the communications application 52. The above-described cooperation between the packet processor 51, the communications application 52 and the wireless communications interface 53 for permitting bidirectional packet communications via the wireless communication link 54 is well known to workers in the art.

According to the invention, an address encoder/decoder 55 is coupled to the packet processor 51. The address encoder/decoder can receive at 56 a user address from the packet processor 51, for example one of the user numbers illustrated in FIG. 2. In response to the received user address, the address encoder/decoder 55 provides an encoded address at 57, which the encoded address includes AM_ADDR bits or a combination of AM_ADDR bits and TYPE bits, for example as shown in FIG. 2. The encoded address can then be inserted by the packet processor 51 into an outgoing packet. Similarly, the address encoder/decoder 55 can receive from the packet processor 51 an encoded address from an incoming packet (which encoded address can include AM_ADDR bits or a combination of AM_ADDR bits and TYPE bits), and then decode the encoded address to provide the corresponding user address to the packet processor at 56.

FIG. 6 (taken in combination with FIG. 5) diagrammatically illustrates pertinent portions of a master device embodiment which can implement the auxiliary header feature illustrated in FIGS. 3 and 4. The embodiment of FIG. 6 includes an auxiliary header controller 61 which receives, at an input 62 thereof, information from the packet processor 51 indicating a new packet type in the packet flow. The auxiliary header controller 61 also receives at an input 63 thereof information from the packet processor 51 which indicates when a negative acknowledgment (NAK) needs to be sent to a particular slave. In response to the information received at 62 and 63, the auxiliary header controller 61 outputs to the packet processor 51 the aforementioned auxiliary header indicator and a suitable auxiliary header (when needed) for inclusion at a predetermined position in an outgoing packet. The packet processor 51 can accommodate the auxiliary header by extending the packet into the guard time conventionally provided between Bluetooth™ packets.

Figure 7:
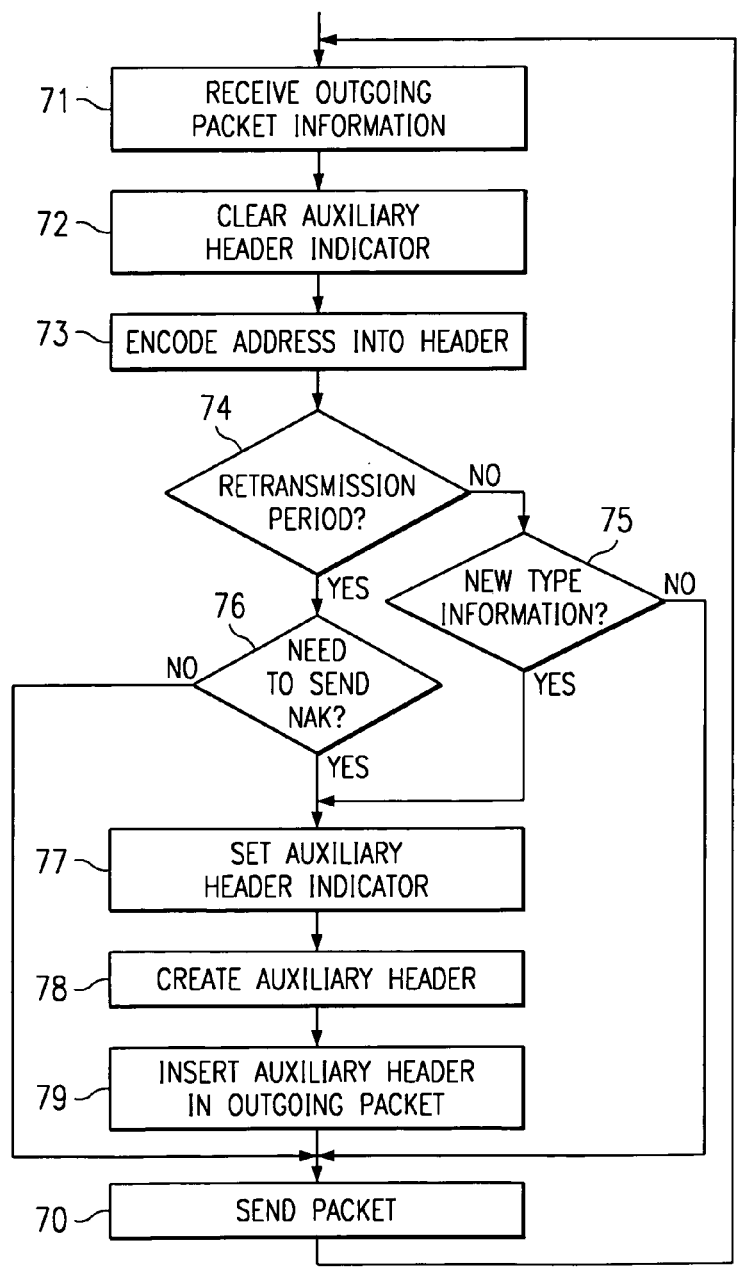
FIG. 7 illustrates exemplary operations which can be performed by the embodiments of FIGS. 5 and 6.

FIG. 7 illustrates exemplary operations which can be performed by the embodiments of FIGS. 5 and 6. After receiving outgoing packet information for a given slave at 71, the auxiliary header indicator is cleared at 72. At 73, the slave's user address is encoded into the header, for example, according to the encoding scheme illustrated in FIG. 2. It is then determined at 74 whether or not the outgoing packet is being sent during a time slot of a retransmission period. If not, it is determined at 75 whether there is a new packet type. If not, the packet is transmitted at 70. If it is determined at 75 that there is a new packet type, the auxiliary header indicator is set at 77, and an auxiliary header including the new packet type information and associated HEC information is created at 78. After inserting the auxiliary header in the outgoing packet at 79, the packet is transmitted at 70.

If it is determined at 74 that the outgoing packet is associated with a retransmission time slot, it is then determined at 76 whether there is a need to send a NAK to another slave device. If not, the packet is transmitted at 70. Otherwise, the auxiliary header indicator is set at 77, and an auxiliary header is created at 78, including the address of the slave device to which the NAK is to be directed and associated HEC information. Thereafter, at 79, the auxiliary header is inserted into the outgoing packet, and the packet is transmitted at 70. After transmission of the packet at 70, the next outgoing packet information is awaited at 71.

FIG. 8 diagrammatically illustrates pertinent portions of exemplary embodiments of a slave device according to the invention. The slave device of FIG. 8 includes a packet processor 81 coupled for bidirectional communication with a communications application 82 and a wireless communications interface 83. The packet processor 81, communications application 82 and wireless communication interface 83 can cooperate in generally the same fashion described above with respect to the corresponding components 51–53 of FIG. 5 to permit bidirectional packet communications with a master device via a wireless communication link 84, for example a Bluetooth™ radio link. According to the present invention, an address decoder 85 is coupled to the packet processor 81 for receiving therefrom at 86 encoded addresses, for example addresses encoded in the manner illustrated in FIG. 2. In response to the encoded addresses received at 86, the address decoder outputs corresponding decoded addresses (for example the user numbers of FIG. 2) to the packet processor at 87.

FIG. 9 (taken in combination with FIG. 8) diagrammatically illustrates pertinent portions of further exemplary embodiments of a slave device according to the invention. The slave device of FIG. 9 includes a MAC (media access controller) processor 91 coupled to receive the user address 87 output from the address decoder 85, and also coupled to receive from the packet processor 81 the above-described auxiliary header indicator and auxiliary header. In response to the user address, the auxiliary header indicator and the auxiliary header, the MAC processor 91 outputs appropriate information to the packet processor 81. For example, the MAC processor 91 can, at 92, instruct the packet processor 81 to perform a conventional retransmission operation to retransmit a packet to the master device. At 93, the MAC processor 91 can signal the packet processor 81 to process an incoming packet in conventional fashion. At 94, the MAC processor 91 can provide to the packet processor 81 auxiliary packet TYPE information from the auxiliary header. The packet processor 81 can then use this auxiliary TYPE information as if it has been received in the standard TYPE field of the incoming packet.

Figure 10:
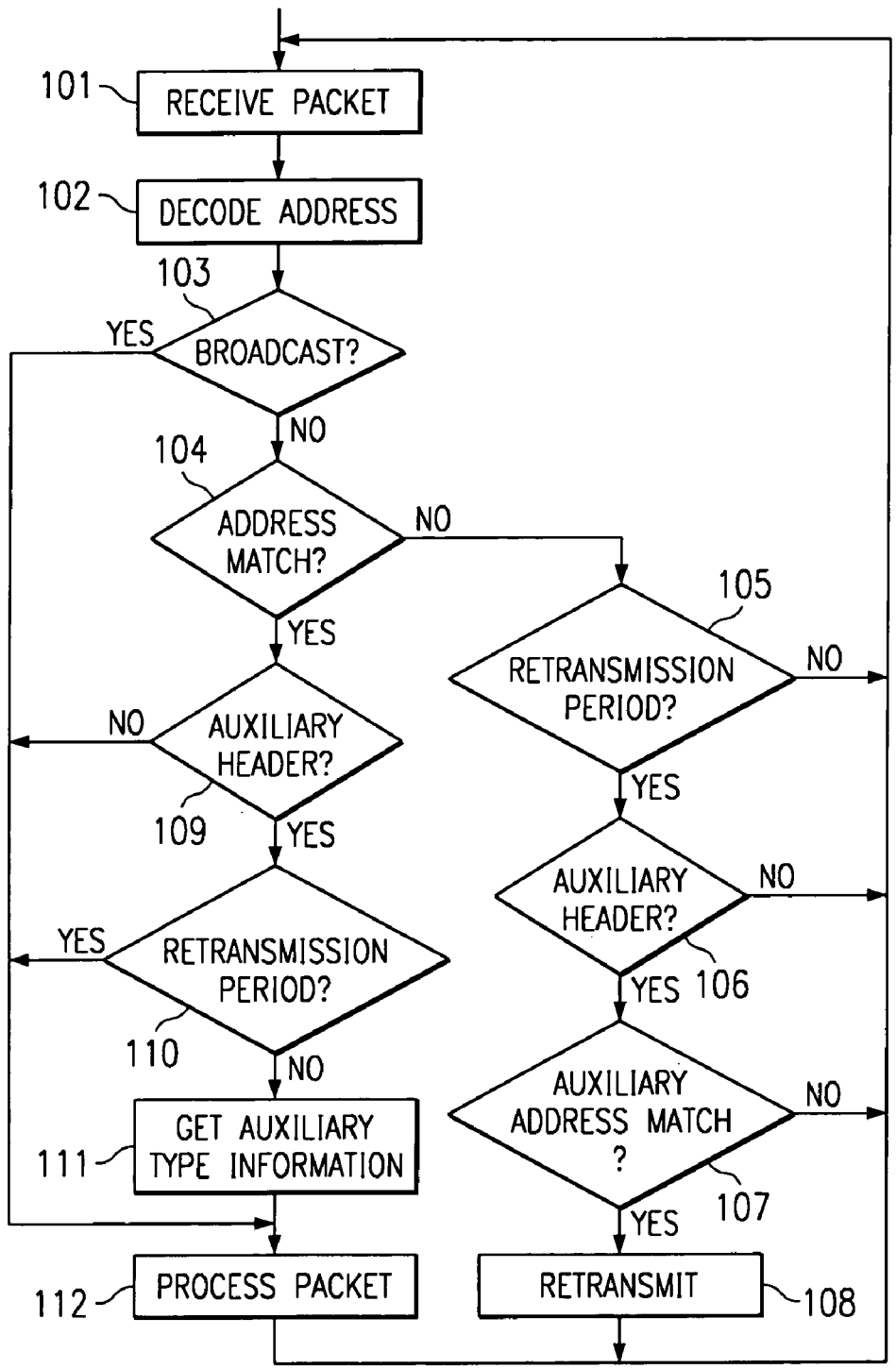
FIG. 10 illustrates exemplary operations which can be performed by the embodiments of FIGS. 8 and 9.

FIG. 10 illustrates exemplary operations which can be performed by the embodiments of FIGS. 8 and 9. After receiving an incoming packet at 101, the encoded address is decoded at 102, for example in the manner illustrated in FIG. 2. It is thereafter determined at 103 whether the decoded address indicates a broadcast packet. If so, the broadcast packet can be processed in conventional fashion at 112. Otherwise, it is determined at 104 whether or not the decoded user address matches the address of the slave device. If so, it is determined (from the auxiliary header indicator) at 109 whether or not the packet includes an auxiliary header. If not, the packet can be processed in conventional fashion at 112. Otherwise, it is determined at 110 whether or not the packet has been received during a retransmission time slot. If so, then the received packet can be processed at 112. Otherwise, the auxiliary TYPE information is retrieved from the auxiliary header at 111 (and its HEC information checked), after which the packet can be processed at 112 using the auxiliary TYPE information (assuming its HEC information checked correctly).

Returning to the decision at 104, if the decoded address does not match the address of the slave device, it is determined at 105 whether or not the packet has been received during a retransmission time slot. If not, the next packet is awaited at 101. Otherwise, at 106, the auxiliary header indicator is used to determine whether or not the received packet includes an auxiliary header. If not, the next packet is awaited at 101. Otherwise, it is determined at 107 whether or not the address provided in the auxiliary header matches the address of the slave device (and whether the associated HEC information checks correctly). If not, the next packet is awaited at 101. However, if the address in the auxiliary header matches the address of the slave device at 107, this represents a NAK from the master, so the slave device thereafter (e.g., in the next time slot) performs a conventional retransmission operation at 108, after which the next packet is awaited at 101.

FIG. 11 is similar to FIG. 1, but illustrates an exemplary modification of the Bluetooth™ AM_ADDR header field according to the present invention. In the example of FIG. 11, the AM_ADDR header field includes four bits instead of the conventional three bits. Thus, the size of the Bluetooth™ header is extended in FIG. 11 by a total of three bits (assuming a ⅓ coding rate). According to the invention, the FIG. 1 packet header with 3 AM_ADDR bits can be used to address 7 conventional slave devices (allowing one address for broadcast packets) as in the prior art, and the extended length header with four AM_ADDR bits can be used to address an additional 16 slave devices. These latter 16 slave devices must be able to perform HEC checks for both the standard header length and the extended header length, in order to ensure that they are able to identify a broadcast packet, defined for example by a 3-bit AM_ADDR of 000. On the other hand, slave devices which are equipped only to receive and perform HEC checks on standard length headers (e.g., conventional slave devices) will discard any packets having extended length headers, because the standard length HEC check can be expected to fail when applied to the extended length header.

Figure 12:
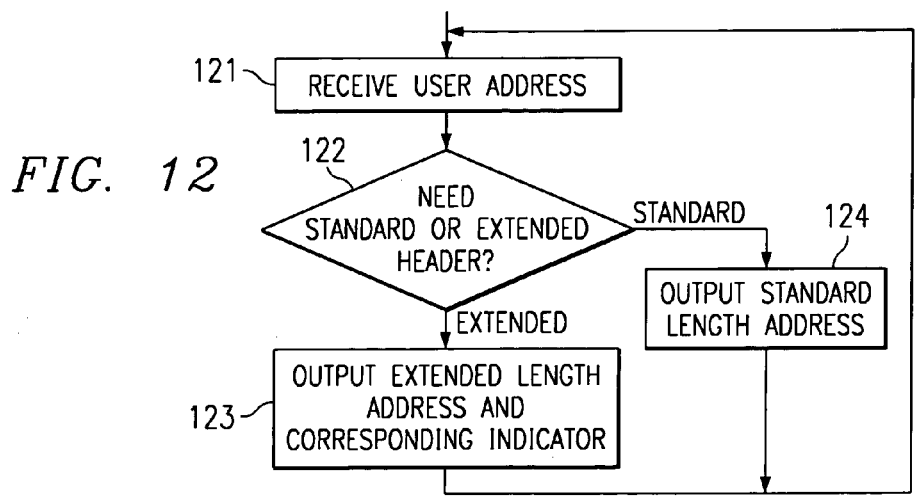
FIG. 12 illustrates exemplary operations which can be performed by the address encoder/decoder of FIG. 5 to implement the extended header technique of FIG. 11.

FIG. 12 illustrates exemplary operations which can be performed by the address encoder/decoder of FIG. 5 in extended header embodiments according to FIG. 11. After a user address is received at 121, it is determined at 122 whether the received user address is to be encoded using the standard length AM_ADDR header field of FIG. 1 or the extended AM_ADDR header field of FIG. 11. If the standard address field is selected at 122, then the appropriate standard length address code is output (to packet processor 51 of FIG. 5) at 124. If the extended length address field is selected at 122, then the appropriate extended length address code is output (to the packet processor 51 of FIG. 5) at 123, along with a corresponding indicator which indicates to the packet processor 51 that the extended address field is to be used. The additional packet length necessitated by the extended header field can be easily accommodated in systems such as Bluetooth™ systems, by extending the packet into the guard time that is conventionally provided between packets in such systems.

Figure 13:
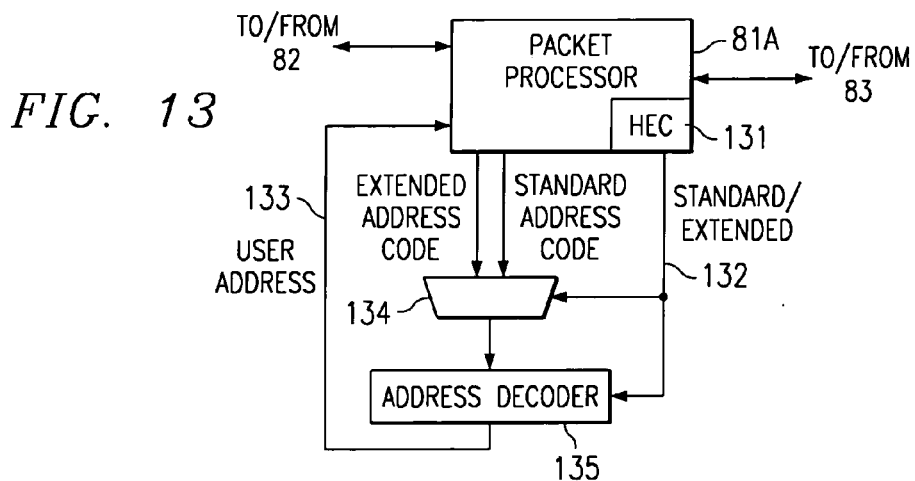
FIG. 13 illustrates diagrammatically pertinent portions of a further exemplary embodiment of a slave device according to the invention which supports the extended header technique of FIG. 11.

FIG. 13 (taken in combination with FIG. 8) diagrammatically illustrates pertinent portions of an exemplary embodiment of a slave device which supports the extended address field technique illustrated in FIG. 11. In the embodiment of FIG. 13, a packet processor 81A can communicate bidirectionally with the communications application 82 and the wireless communications interface 83 in generally the same fashion described above with respect to FIG. 8. In addition, the HEC section of packet processor 81A is operable to perform, on each incoming packet, a first HEC check which assumes the conventional header length, and a second HEC check which assumes an extended header length, for example due to the extended address field illustrated in FIG. 11. If neither HEC checks out correctly, then the packet can be discarded. Otherwise, the HEC section 131 outputs a signal 132 indicating whether the received packet has a standard length header or an extended length header. Also, the packet processor 81A extracts from the received packet the bits that would correspond to the standard length address code (for example, the 3-bit AM_ADDR field of FIG. 1) and the bits that would correspond to the extended length address code (for example the 4-bit AM_ADDR field of FIG. 11). These two extracted codes are provided to a selector 134 which is controlled by the signal 132 output from the HEC section 131. The output of selector 134 is coupled to an address decoder 135. The selector 134 provides the extended address code to the address decoder 135 when the signal 132 indicates that an extended length header has been received, and provides the standard address code to the decoder 135 when the signal 132 indicates that the standard header length has been received. In response to the received code, the address decoder 135 outputs the user address 133 to the packet processor 81A.

Figure 14:
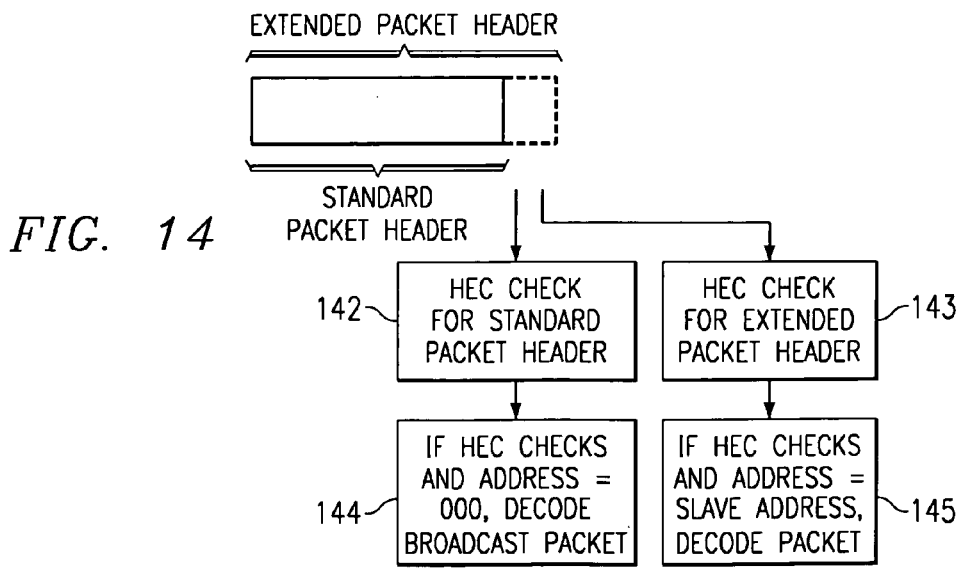
FIG. 14 illustrates exemplary operations which can be performed by the embodiment of FIG. 13.

FIG. 14 illustrates exemplary operations which can be performed by the embodiment of FIG. 13. As shown in FIG. 14, HEC checks for the standard header length and the extended header length are performed at 142 and 143, respectively. If the standard length HEC checks correctly, it is determined at 144 whether or not the standard length address code is 000, which would indicate that a broadcast packet has been received. If the extended length HEC checks correctly, it is determined at 145 whether the extended length address matches the address of the receiving slave device. If so, the packet can be processed as usual. If the extended address does not match the address of the slave device, then the packet can be discarded.

The above-described performance of an HEC check for both the standard packet header length and the extended packet header length is simple to perform, because it can be implemented, for example, with a conventional linear feedback shift register.

Should a master send a Bluetooth™ ACL (asynchronous connection-less link) packet using an address defined by the four-bit AM_ADDR field described above, but during a Bluetooth™ SCO (synchronous connection-oriented) slot reserved for a conventional slave device which utilizes only 3 AM_ADDR bits, the conventional slave device would in this instance receive a packet whose HEC check would fail, thereby causing the conventional slave device to respond with a NAK packet in its slave-to-master time slot. At the same time, the slave device that was actually addressed using the four-bit AM_ADDR field can also be expected to respond, thus resulting in a collision. One solution to this difficulty is for the master device to avoid sending ACL packets in SCO slots reserved for conventional slave devices. Another solution is for the slave device having the 4 bit address to use a modified frequency hopping sequence relative to the conventional slave device, such that the two devices will transmit to the master on different frequencies and avoid collision.

Although the above-described exemplary embodiments illustrate the invention generally in terms of transmissions from a master device to a plurality of slave devices, the invention is also applicable to transmissions from the slave devices to the master device. Accordingly, the invention contemplates providing the above-described master device features in slave devices, and also providing the above-described slave device features in master devices, in order to apply the present invention to slave-to-master transmissions as well as to the master-to-slave transmissions described above.

It will be evident to workers in the art that the above-described embodiments of FIGS. 2–14 can be readily implemented, for example, by suitable modifications in software, hardware, or a combination of software and hardware, in conventional wireless packet communication devices, for example Bluetooth™ master and slave devices.

Although exemplary embodiments of the invention are described above in detail, this does not limit the scope of the invention, which can be practiced in a variety of embodiments.

What is claimed is:

1. A method of controlling communication of a packet of information from a Bluetooth™ transmitting device to an intended recipient device, the packet having a plurality of fields including a predetermined address field for carrying address information indicative of the intended recipient device of the packet, comprising:

the Bluetooth™ transmitting device providing in a further field of the packet other than the predetermined address field address information indicative of the intended recipient device for which the packet is intended;

the Bluetooth™ transmitting device providing in the predetermined address field of the packet first information which indicates that the further field of the packet contains the address information; and the Bluetooth™ transmitting device transmitting the packet on a communication link.

2. The method of claim 1, including the intended recipient device receiving the packet and detecting the first information in the predetermined address field and retrieving the address information from the further field in response to detection of the first information.

3. The method of claim 1, wherein said step of providing first information includes the Bluetooth™ transmitting device providing a predetermined code in the predetermined address field.

4. The method of claim 1, wherein the further field is a packet type field for normally carrying information indicative of the packet type.

5. The method of claim 1, wherein the Bluetooth™ transmitting device and the intended recipient device are wireless communication devices.

6. The method of claim 5, wherein the Bluetooth™ transmitting device is a Bluetooth™ master device and the intended recipient device is a Bluetooth™ slave device.

7. The method of claim 1, including the Bluetooth™ transmitting device selectively inserting into the packet at a predetermined position therein second information that is normally carried by the further field but is displaced from the further field by the address information, the Bluetooth™ transmitting device providing in the further field third information which indicates that the second information has been inserted into the packet.

8. The method of claim 7, including the Bluetooth™ transmitting device selectively inserting into the packet at said predetermined position fourth information for use by a further packet communication device other than the intended recipient device.

9. The method of claim 8, wherein the fourth information includes a request for the further device to retransmit a packet to the Bluetooth™ transmitting device.

10. The method of claim 9, including the further device receiving the packet and determining that the address information in the further field does not correspond to the further device, the further device thereafter determining from the third information that the fourth information is included in the received packet, and the further device determining whether the fourth information includes a request for the further device to retransmit a packet to the Bluetooth™ transmitting device.

11. A method of controlling communication of a packet from a Bluetooth™ master wireless transmitting packet communication device to a wireless recipient packet communication device, the packet including a predetermined address field for carrying address information indicative of an intended recipient of the packet, comprising:

providing identification information in said address field which identifies a Bluetooth™ slave recipient packet communication device for which the packet is intended;

responsive to the identification information in said address field, a transmitting packet device producing address information indicative of the intended recipient device and extending the address field of the packet to accommodate the address information and providing the address information in the extended address field; and the transmitting device transmitting the packet on a communication link.

12. The method of claim 11, including the intended recipient device receiving the packet and using error check information from the received packet to determine whether the address field of the received packet is an extended address field and thereafter decoding the address information from the address field of the received packet.

13. The method of claim 12, wherein said using step includes the intended recipient device performing an error check on the received packet under an assumption that the received packet does not contain an extended address field, and said using step further including the intended recipient device performing an error check on the received packet under an assumption that the received packet does contain an extended address field.

14. A packet communication apparatus for communicating a packet of information to a further packet communication apparatus, the packet having a plurality of fields including a predetermined address field for carrying address information indicative of an intended recipient of the packet, comprising:

a packet processor for providing in a further field of the packet other than the predetermined address field address information indicative of the further packet communication apparatus, said packet processor further for providing in the predetermined address field of the packet first information which indicates that said further field of the packet contains said address information;

a controller coupled to said packet processor for selectively directing said packet processor to insert into the packet at a predetermined position therein second information that is normally carried by said further field but is displaced from said further field by said address information, said packet processor responsive to said controller for providing in said further field third information which indicates that said second information has been inserted into the packet; and a communication interface coupled to said packet processor for transmitting the packet on a communication link.

15. The apparatus of claim 14, wherein said communication interface is a wireless communication interface and the communication link includes a wireless communication link.

16. The apparatus of claim 15, provided as a Bluetooth™ master device.

17. The apparatus of claim 15, wherein said controller is further for selectively directing said packet processor to insert into the packet at said predetermined position fourth information for use by a third packet communication apparatus.

18. The apparatus of claim 17, wherein said fourth information includes a request for the third apparatus to retransmit a packet to said communication interface.

19. The apparatus of claim 14, wherein said further field is a packet type field for normally carrying information indicative of the packet type.

20. A Bluetooth™ slave device for receiving a packet of information from a further packet communication apparatus, the packet having a plurality of fields including a predetermined address field for carrying address information indicative of an intended recipient of the packet, comprising:

a wireless communication interface for receiving the packet via a wireless communication link; and an address decoder coupled to said wireless communication interface for detecting in said predetermined address field information which indicates that a further field of the packet contains address information from which the intended recipient of the packet can be determined.

21. A Bluetooth™ master packet communication apparatus for communicating a packet of information to a further packet communication apparatus, the packet including a predetermined address field for carrying address information indicative of an intended recipient of the packet, comprising:

a packet processor for selectively extending said address field of the packet to accommodate said address information in response to information in said predetermined address field, said packet processor further for providing said address information in said extended address field; and a wireless communication interface coupled to said packet processor for transmitting the packet on a wireless communication link.

22. A packet communication apparatus for receiving a packet of information from a further packet communication apparatus, the packet including a predetermined address field for carrying address information indicative of an intended recipient of the packet, comprising:

a communication interface for receiving the packet from a communication link; and a packet processor coupled to said communication interface for using error check information from the received packet to determine whether the address field of the received packet is an extended length address field.

23. The apparatus of claim 22, wherein said packet processor is operable for performing an error check on the received packet under an assumption that the received packet does not contain an extended length address field, and is further operable for performing an error check on the received packet under an assumption that the received packet does contain an extended length address field.

24. The apparatus of claim 22, wherein said communication interface is a wireless communication interface and the communication link includes a wireless communication link.

25. The apparatus of claim 24, provided as a Bluetooth™ slave device.

* * * * *